United States Patent [19]

Ramseier et al.

[11] Patent Number: 4,715,314
[45] Date of Patent: Dec. 29, 1987

[54] ELECTROSTATIC POWDER COATING INSTALLATION

[75] Inventors: Hans-Ulrich Ramseier; Fritz Brechbühler, both of Münsingen, Switzerland

[73] Assignee: H. U. Ramseier, Rubigen, Switzerland

[21] Appl. No.: 855,726

[22] Filed: Apr. 25, 1986

[30] Foreign Application Priority Data

Apr. 30, 1985 [CH] Switzerland ............... 1834/85

[51] Int. Cl.[4] ............................ B05B 5/02
[52] U.S. Cl. ................... 118/631; 118/326; 118/634; 118/DIG. 7
[58] Field of Search ............. 118/634, 326, DIG. 7, 118/631

[56] References Cited

U.S. PATENT DOCUMENTS 2,560,047 7/1951 York et al. .................. 118/634
4,204,497 5/1980 Lever ........................ 118/634
4,378,728 4/1983 Berkmann .................. 118/634 X
4,409,009 10/1983 Lissy ........................ 118/634 X

FOREIGN PATENT DOCUMENTS 0123967 11/1984 European Pat. Off. .
3140454 4/1983 Fed. Rep. of Germany .
920203 4/1947 France .
560558 4/1975 Switzerland .
1310309 3/1973 United Kingdom .

Primary Examiner—Evan K. Lawrence
Attorney, Agent, or Firm—Marks, Murase & White

[57] ABSTRACT

A powder coating installation comprising a cabin having walls made of a non-conductive plastic material. The lower part of the cabin has a V-shaped section and terminates in a collecting channel which is connected to a suction device. The installation further comprises a cleaning device with a hollow frame, the form of which compliments the contours of the internal form of the cabin and which comprises gas outlet holes along its periphery. The frame is connected to a source of pressurized fluid, e.g., air. The cleaning device further comprises cleaning means such as sponges, cloths and the like, which may be provided on the same frame or on a separate frame. Use of a non-stick, non-conductive cabin and of the cleaning device enables the installation to be easily and quickly color converted and eliminates much of the previously wasted colored powder.

19 Claims, 4 Drawing Figures

ELECTROSTATIC POWDER COATING INSTALLATION

BACKGROUND OF THE INVENTION

The invention relates to an electrostatic powder coating installation which includes a cabin.

The electrostatic powder coating comprising a fine plastic powder which is electrostatically loaded and sprayed. By electrically grounding the object to be coated, the electrically loaded particles of powder will be deposited thereon. Within a short time the powder forms a thin, uniform coating. By subsequent heating in a furnace, the powder melts and produces a resistant coating. Although the spraying process occurs in cabins, a great part of the sprayed powder does not reach the workpiece. By means of air suction and filtering, the excess powder is recovered and delivered back to the powder delivery circuit. The powder coating installation has important advantages over wet lacquer processes, such as more efficient use of material because of powder recovery, no exhaust vapors, which is of increasing importance in regards to environmental concerns, the ability to produce a thicker layer in a single operation, shorter burning times, and a more resistant quality of the coating. On the other hand, problems arise when it is desired to change colors because all the elements participating in the spraying operation, like the powder tank, feed, spray gun, cabin suction and filter, must be changed or cleaned. In known installations such color changes have been too expensive to routinely accomplish except for large production runs.

SUMMARY OF THE INVENTION

It is therefore an object of the present invention to realize an electrostatic powder coating installation which renders possible a rapid and economical change of color and substantial saving of non-coated color.

An electrostatic powder coating installation according to the present invention comprises a cabin with two ends, each provided with a passage for workpieces. The inner walls of the cabin are made from a slick, electrically non-conductive material. The cabin further comprises a collection channel connected to a suction device and preferably a cleaning device.

BRIEF DESCRIPTION OF THE DRAWINGS

The invention will be described further by way of example, with reference to the accompanying drawings.

DESCRIPTION OF THE PREFERRED EMBODIMENT

Figure 1:
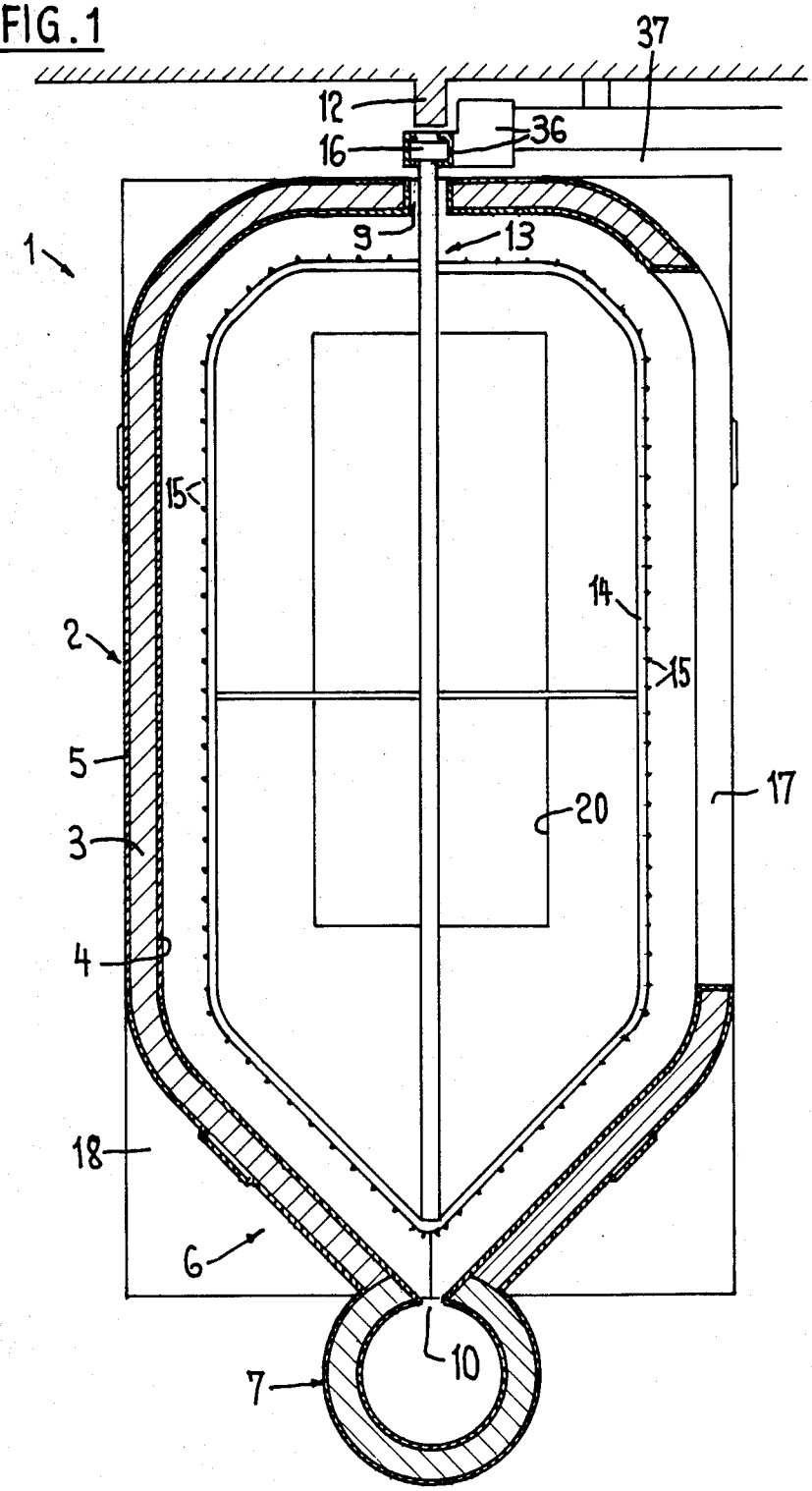
FIG. 1 shows a vertical cross section through the cabin.

FIG. 1 illustrates a cabin 1 which includes walls 2 made of an electrically non-conductive material, i.e., plastic. In the present example, the wall comprises a core 3 of polyurethane foam with a thickness of 100 mm coated at the inside with a 8 mm thick PVC layer 4 and at the outside with another plastic coating 5. It is clear that the thickness of the various coatings may vary and that other, appropriate materials can be used.

The lower part 6 of the cabin has the form of a V such that the powder residues can easily reach the channel connected to it, from which they are sucked off. The upper edges of the cabin are rounded off such that as little powder residue as possible remains stuck. The cabin is held in a frame which may consist of steel plates and comprises at the top an opening 9 through which the carriage with the workpieces or the cleaning frame, which will be described later, can be introduced. The channel opening 10 and the V-shaped bottom of the cabin form a transition between the lower part of the cabin and the collecting channel 7. The channel opening 10 has a varying width which gradually increases from the front, i.e., where the suction pipe 11 is connected, to the back. This results in a generally uniform suction speed from the front to the back of the cabin. Above the cabin a rail system 12 is provided, on which either the workpieces or a cleaning device can be transported and introduced into the cabin.

As indicated above, in order to effect a rapid changeover of the cabin for another color, all elements must be exchanged or cleaned. Until now, the cabin was the most difficult element to clean. To facilitate rapid cleaing, all residues of powder must be quickly removed. To facilitate such removal the cabin walls are made of plastic lined, non-conductive materials and are configured with an appropriate surface topography to which the particles will not tend to stick.

In order to rapidly eliminate any powder residues from the internal walls of the cabin to the suction channel 7, a cleaning device 13 is preferably provided which is suspended from a transporter or rail 12 and which can be displaced through the cabin. The cleaning device consists of a frame 14 having a form adapted to snuggly complement the internal form of the cabin. The frame consists of tubes provided with a plurality of holes 15 distributed over its periphery. The holes of the frame are connected to a pressurized air pipe or the like and the frame is guided over a suspension 16. While the frame traverses the cabin, air under pressure is delivered to the holes 15, and all dislodged powder residues are sucked off via the suction channel 7 through the section pipe 11. This first cleaning operation eliminates at least 95% of the powder residue from the cabin. This residue may then be reutilized.

In many cases, such cleaning is not sufficient and it is necessary to submit the cabin to a more intensive cleaning. To this end, additional devices may be provided. Wet sponges have been found most advantageous, such sponges being either attached to the frame 14 or provided on a special frame. It is also possible, after the cleaning operation with the wet sponges, to take up any remaining residue by means of cloths, leather or other cleaning rags. Since the rails, in their forward motion, may be fully automatically controlled the cleaning process is also automatically controllable. It is also possible to provide rotating brushes, either to the frame 14 or to a frame similar to the frame 14 which, during the forward motion of the cleaning device, traverses the cabin walls while the brushes rotate. It is also advantageous to simultaneously vibrate walls of the cabin so that any powder residue falls into the channel 7.

Figure 2:
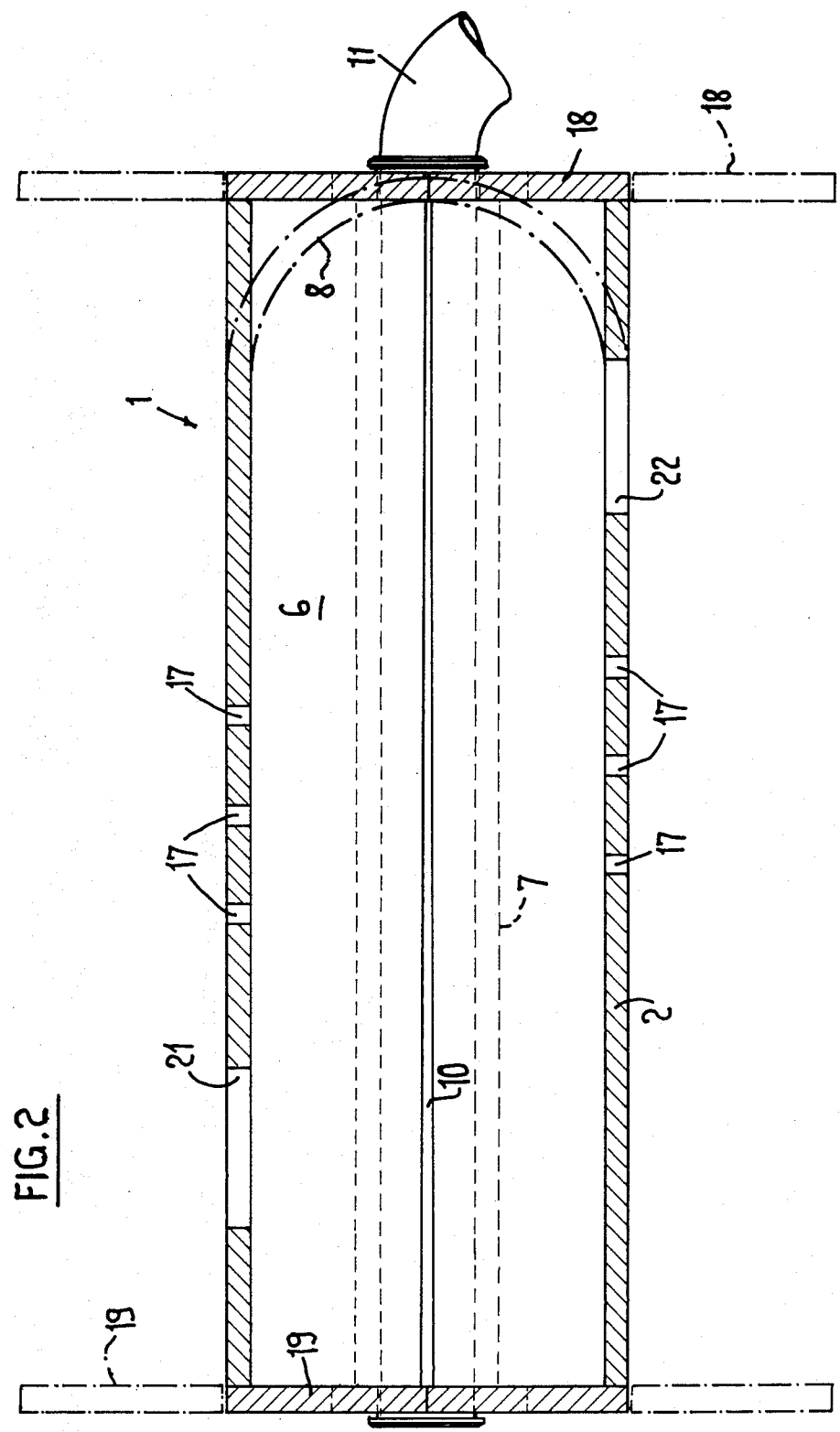
FIG. 2 shows a horizontal cross section through the cabin.
Figure 3:
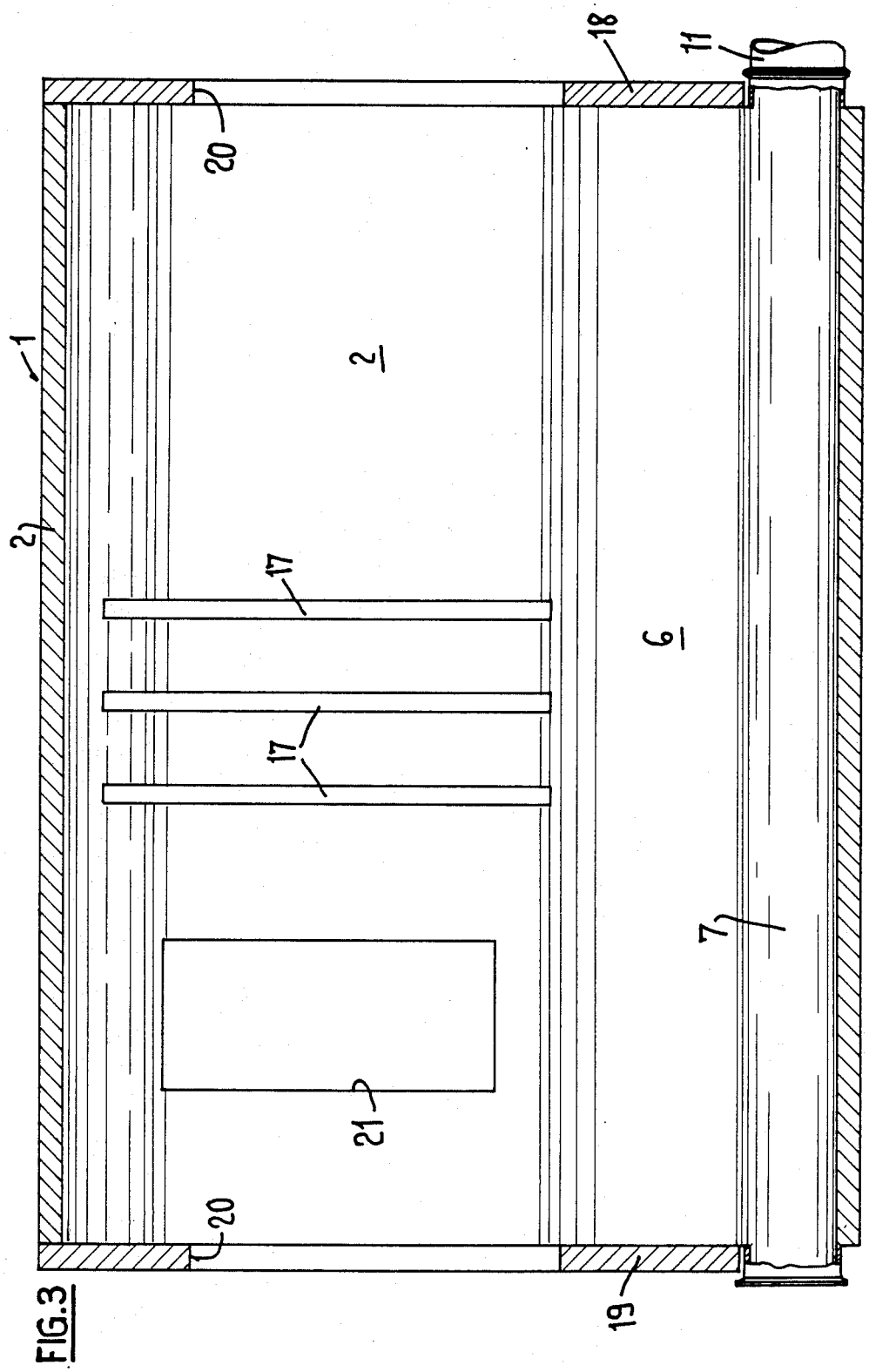
FIG. 3 shows a side view of the cabin of FIG. 1.

As shown more particularly in FIG. 3, the cabin, along each of its two longitudinal sides has three passages 17 as well as the larger openings 21 or 22, respectively. The three passages 17 are provided for a powder spraying device which is arranged on a working platform while the openings 21 and 22, respectively, are provided for a manual preprocessing and after-processing by means of a spraying gun. These passages and openings may be easily and rapidly cleaned manually. In the present example, the front sides of the cabin have the form of two-leaf gates 18 and 19 which have openings 20. For treatments, i.e., for the powder coating, the openings 20 need only be sufficiently large to permit passage of the suspended workpieces. For the introduction of the cleaning device, it is necessary, in the illustrated example, for the cabin to be fully opening, at least one front side, to pass the frame 14. According to the method of cleaning, it may be advantageous to open both ends of the cabin to permit an intensive cleaning of it. When the ends are opened, the gates may be spearately cleaned. During the first cleaning operation with air under pressure and suction, the gates as well as the opening 20 and the passages 17 can be tightly closed, also so that as little powder as possible reaches the outside. This also applies to the lateral openings 21 and 22. As shown in FIG. 2, the openings 21, 22 and the passages 17 are not disposed strictly opposite to each other but are arranged rather asymmetrically with respect to each other. If gates are provided only a one end, the other end is preferably rounded as shown in dot-and-dashes lines by the reference numeral 8. In this case, it is advantageous to ensure that the cleaning device is turnable, in order for the rounded end to be better cleaned.

As another simplification, the cabin may be equipped with only passages for the workpieces while both ends are formed as indicated by the reference numeral 8. This results in a cabin without any movable parts such as gates. The cleaning device is then correspondingly adapted, i.e., the frame must be turnable and displaceable in the vertical direction so that the device can be introduced into the cabin through a workpiece passage and then turned by 90° to travel through the cabin.

Figure 4:
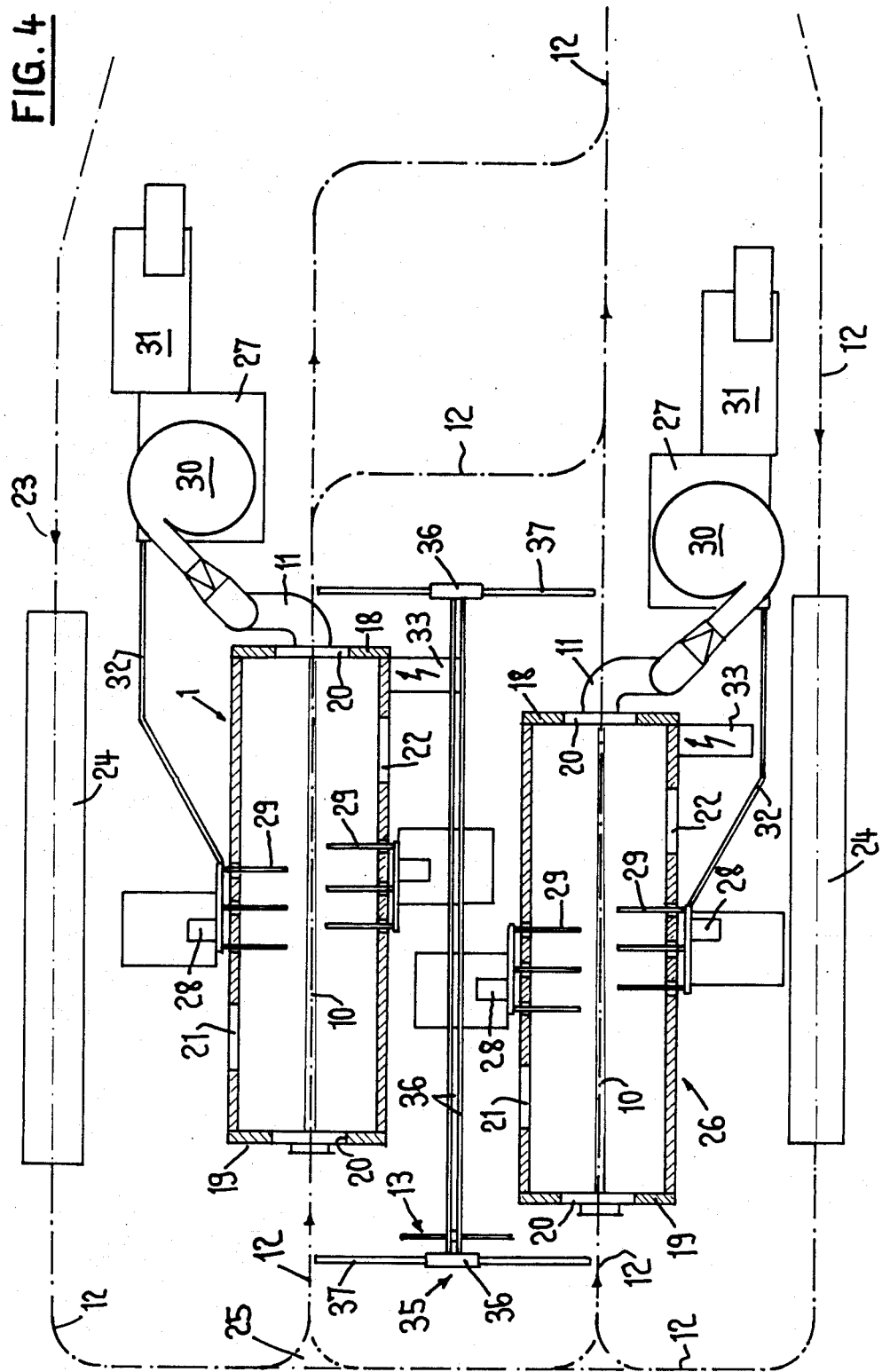
FIG. 4 shows schematically a powder coating installation according to the invention.

In FIG. 4, a part of an electrostatic powder coating installation consisting of two separated full circuits is schematically shown. It is clear, however, that an installation may operate with only one full cirucit or with more than two circuits. Following the upper circuit in the direction of the arrow 23, there is provided a last cleaning stage 24 for the workpieces from which the latter may be forwarded either into the first cabin 1 or, by means of a switching element 25, into the cabin 26.

Two lifting posts 28 are preferably arranged on both sides of the cabin to move the spray guns 29 in the horizontal and vertical direction. According to the particular installation, less or more than three guns may be provided. The air powder mixture is sucked from the collecting pipe 11 by means of a cyclone 30 through a suction fan 31 having a subsequent filter whereby about 95% of the powder is separated and used again. This powder reaches the powder tank 27 and from there is fed to the spray guns 29 through the pipes 32. In large installations, and according to the amount of powder, two or more suction fans with filters may be necessary. Electrical switch cases 33 provide a source of high voltage for the spray guns 29.

Between the cabins 1 and 26 a transporation and parking device 35 is arranged for the cleaning device 13. The cleaning device 13 is on a displaceable support 36 which runs on rails 37 to bring the cleaning device in front of one or the other cabin. The support 36 is preferably formed as a rail on which the suspension of the cleaning device runs. As mentioned above, it would also be possible to lift the cleaning device onto the transportation rails 12 for the workpieces and to execute the cleaning operation using this system of transportaiton rails. In the example of FIG. 4, the cleaning device is independent of the workpiece transporting rails and uses the transportation and parking device 35. This makes it possible to clean one cabin while spraying is in progress in the other cabin. The transportation and parking device as well as the cleaning device are electronically controled such that the processes take place largely automatically.

The electrostatic powder coating installation may comprise other known elements such as wet cleaning installations, water, air and heat recovery installations, as well as burning furnaces and further cleaning elements such as filters or the like.

Through the use of plastic coated cabin walls on one hand and of a cleaning device, possibly in several parts, on the other hand, it is possible to reduce the color conversion time to a fraction of an hour, thus permitting an economical and rational working of such installations for small and middle size production runs.

We claim:

1. An installation for applying an electrostatic powder coating of different colors to workpieces, comprising:
    a cabin having longitudinally extending side walls, end walls and a bottom portion, each of said end walls having an opening for passage of workpieces into said cabin, an interior side of said walls and bottom portion being formed of a relatively non-stick, electrically non-conductive material and formed to be essentially free of any powder trapping discontinuities, said bottom portion comprising a smoothly varying generally V-shaped transition region extending longitudinally along the cabin;
    a collecting channel having a variable width opening therein, said opening communicating with said transition region;
    a suction device connected to said collecting channel, the width of said variable width opening being generally proportional to a distance of the opening from the suction device to obtain a generally uniform suction speed from the front to the back of the cabin whereby the amount of powder clinging to the walls of the cabin is reduced.

2. The installation according to claim 1, wherein said material comprises a plastic material.

3. The installation according to claim 1, wherein said walls comprise a core of polyurethane foam, the side of said walls interior to the cabing having thereon a PVC-coating and the side of said walls external to said cabin having thereon a plastic material coating.

4. The installation according to claim 1 wherein said opening is positioned between the lower part of the generally V-shaped transition region and the collecting channel and traverses generally the entire length of said channel.

5. The installation according to claim 1, wherein at least one end wall includes a two-leaf gate having an opening for passing workpieces into the cabin.

6. The installation according to claim 1, wherein one of said end walls is internally rounded to form a continuous surface with said side walls and includes an opening for passing workpieces into said cabin.

7. The installation according to claim 1, wherein both end walls are rounded to form a continuous surface with said side walls, each end wall having an opening for passing workpieces into the cabin.

8. The installation according to claim 1, further comprising means for vibrating the walls of said cabin to thereby loosen any powder therefrom.

9. An installation for applying an electrostatic powder coating of different colors to workpieces, comprising:
- a cabin having longitudinally extending side walls, end walls and a bottom portion, each of said end walls having an opening for passing workpieces into said cabin, an interior side of said walls and bottom portion being formed of a relatively non-stick, electrically non-conductive material and formed to be essentially free of any powder trapping discontinuities, said bottom portion comprising a smoothly varying generally V-shaped transition region extending longitudinally along the cabin;
- a collecting channel extending along said bottom portion and having a variable width opening therein, said opening communicating with said transition region;
- a suction device connected to said collecting channel, the width of said variable width opening being generally proportional to a distance of the opening from the suction device to obtain a generally uniform suction speed from the front to the back of the cabin;
- a cleaning device formed to compliment the internal contours of said cabin;
- means for moving the cleaning device through said cabin whereby the amount of powder clinging to the walls of the cabin is reduced and the interior of the cabin is easily cleaned of any residual powder.

10. The installation according to claim 9, wherein said cleaning device comprises:
- a hollow frame shaped to the internal contours of said cabin;
- fluid outlets disposed along the periphery of said frame;
- a source of pressurized fluid connected to said frame to direct fluid under pressure against the internal walls of said cabin.

11. The installation of claim 10 wherein said fluid is pressurized air.

12. The installation according to claim 10, further comprising a mechanical cleaning device disposed on said hollow frame to contact the interior walls of said cabin.

13. The installation according to claim 12, wherein the mechanical cleaning device is selected from the group consisting of springs, brushes, rotating brushes, rags, cloths and leather.

14. The installation according to claim 10 further comprising a mechanical cleaning device disposed on a frame independent of said hollow frame, said cleaning device being positioned to physically contact interior walls of said cabin.

15. The installation according to claim 14 wherein the mechanical cleaning device is selected from the group consisting of springs, brushes, rotating brushes, rags, cloths and leather.

16. The installation according to claim 9, further comprising means for turning and vertically displacing the cleaning device to as it moves through the cabin whereby the cleaning device is operable to clean essentially all of the interior of the cabin.

17. The installation according to claim 9, further comprising means for vibrating the walls of said cabin to thereby loosen any powder therefrom.

18. The installation according to claim 9, further comprising a transportation and parking device positioned adjacent and external to said cabin for guiding said cleaning device into and through said cabin.

19. The installation according to claim 18 further comprising two cabins, wherein said transportation and parking device is disposed between said cabins, said transportation and parking device being operable to guide said cleaning device selectively to one or the other of said cabins.

* * * * *